US007513978B2

(12) United States Patent
Petillo

(10) Patent No.: US 7,513,978 B2
(45) Date of Patent: Apr. 7, 2009

(54) METHOD AND APPARATUS FOR GENERATING HYDROGEN

(75) Inventor: Phillip J. Petillo, 1206 Herbert Ave., West Deal, Ocean, NY (US) 07712

(73) Assignee: Phillip J. Petillo, Ocean, NJ (US)

( * ) Notice: Subject to any disclaimer, the term of this patent is extended or adjusted under 35 U.S.C. 154(b) by 956 days.

(21) Appl. No.: 10/871,727

(22) Filed: Jun. 18, 2004

(65) Prior Publication Data

US 2005/0016840 A1    Jan. 27, 2005

Related U.S. Application Data

(60) Provisional application No. 60/506,327, filed on Sep. 25, 2003, provisional application No. 60/495,291, filed on Aug. 16, 2003, provisional application No. 60/486,357, filed on Jul. 11, 2003, provisional application No. 60/479,396, filed on Jun. 18, 2003.

(51) Int. Cl.
  *C25B 1/04*   (2006.01)
  *C25B 9/04*   (2006.01)
  *C25B 15/02*  (2006.01)

(52) U.S. Cl. .................. 204/230.5; 204/248

(58) Field of Classification Search ............. None
See application file for complete search history.

(56) References Cited

U.S. PATENT DOCUMENTS

| 2,534,533 | A |   | 12/1950 | Schlesinger et al. | 23/14 |
|---|---|---|---|---|---|
| 3,210,157 | A |   | 10/1965 | Lewis et al. | 23/211 |
| 3,892,653 | A | * | 7/1975 | Pacheco | 204/238 |
| 3,933,676 | A | * | 1/1976 | Wade | 252/188.26 |
| 4,209,368 | A | * | 6/1980 | Coker et al. | 205/525 |
| 4,264,362 | A |   | 4/1981 | Sergev et al. | 75/243 |
| 4,342,792 | A |   | 8/1982 | Brown et al. | 427/453 |
| 4,463,063 | A | * | 7/1984 | Adlhart | 429/19 |
| 4,613,304 | A |   | 9/1986 | Meyer | 431/354 |
| 4,670,122 | A |   | 6/1987 | Mathur et al. | 204/252 |
| 5,089,107 | A | * | 2/1992 | Pacheco | 204/230.2 |
| 5,242,565 | A |   | 9/1993 | Winsel | 204/265 |

(Continued)

FOREIGN PATENT DOCUMENTS

WO    WO 00/70699 A1 * 11/2000

OTHER PUBLICATIONS

Maurice E. Indig & J. Snyder, *Sodium Brohydride, An Interesting Anodic Fuel*, 109 J. Electrochem. Soc. 1104 (Nov. 1962).

(Continued)

*Primary Examiner*—Harry D Wilkins, III

(57) ABSTRACT

An electro-galvanic hydrogen generator system that has two or more anode materials; a cathode material; and an electrolyte. The electrolyte comprises a metal hydride, at least one stabilizing agent, and a solvent. Hydrogen gas is generated whenever an anode material and the cathode material are electrically connected, and the different anode materials can be used separately or in combination to control the quantity and rate of hydrogen generation. An insulating shield may be used to catch reaction debris from the anodes. A removable inert layer may cover the electrodes. The use of cell pressure may regulate the rate of hydrogen generation. The hydrogen generator may have a separate catalyst chamber, and the hydrogen generator may also function as a battery.

1 Claim, 5 Drawing Sheets

U.S. PATENT DOCUMENTS

| | | | | |
|---|---|---|---|---|
| 5,632,998 A | * | 5/1997 | Midha et al. | 424/401 |
| 6,478,936 B1 | * | 11/2002 | Volodarsky et al. | 204/286.1 |
| 6,534,033 B1 | * | 3/2003 | Amendola et al. | 423/648.1 |
| 6,554,877 B2 | | 4/2003 | Finkelshtain et al. | 44/436 |
| 6,562,497 B2 | | 5/2003 | Finkelshtain et al. | 429/15 |
| 6,866,835 B1 | * | 3/2005 | Stephenson | 423/657 |
| 2001/0045364 A1 | * | 11/2001 | Hockaday et al. | 205/338 |
| 2003/0224229 A1 | | 12/2003 | Mann et al. | 429/19 |
| 2004/0009392 A1 | * | 1/2004 | Petillo et al. | 204/248 |

OTHER PUBLICATIONS

H2 report: Issue 503, *Hydrogen From Borax Goes Maritime: Millennium Cell and SRE Compete*, available at http://www.freesen.de/h2report/iss0503.htm 2003.

* cited by examiner

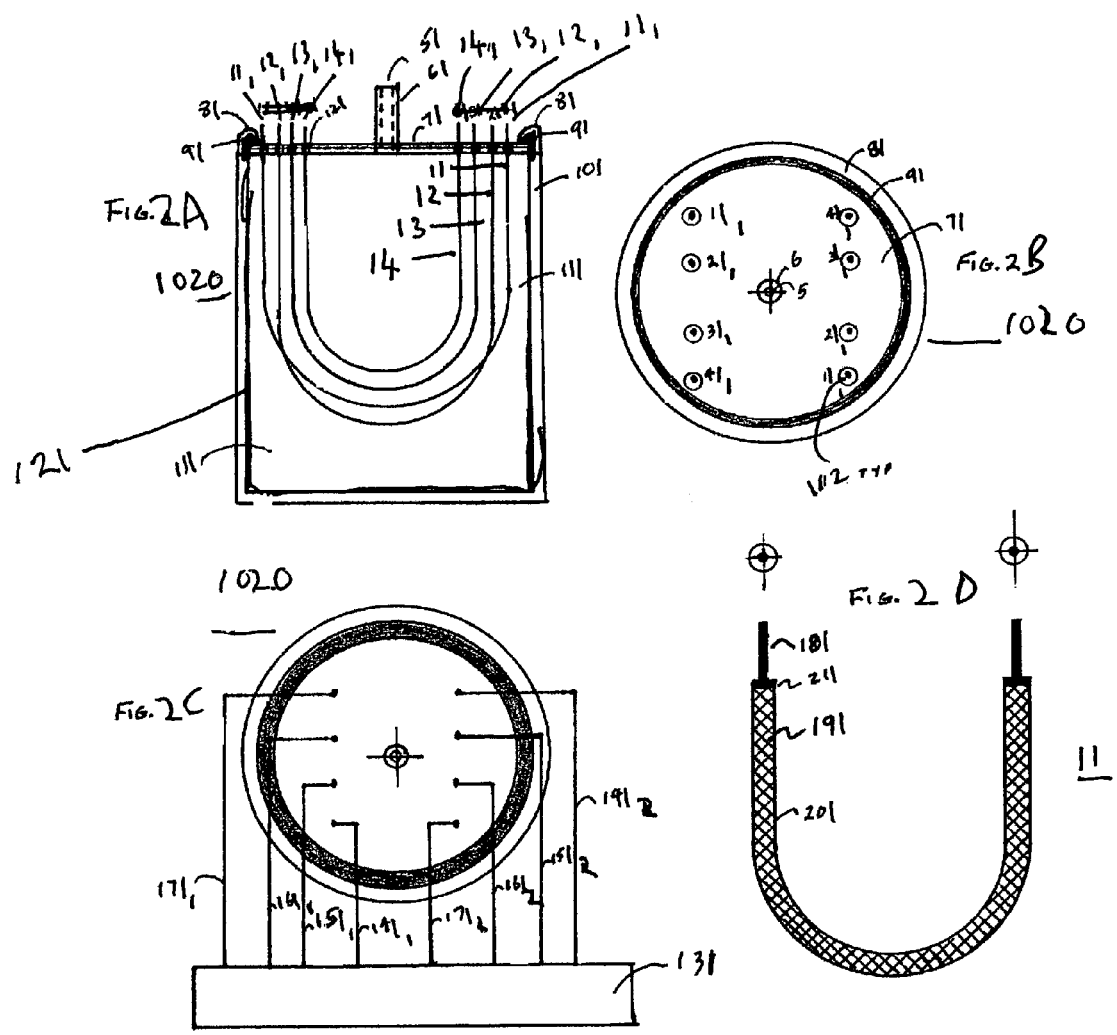

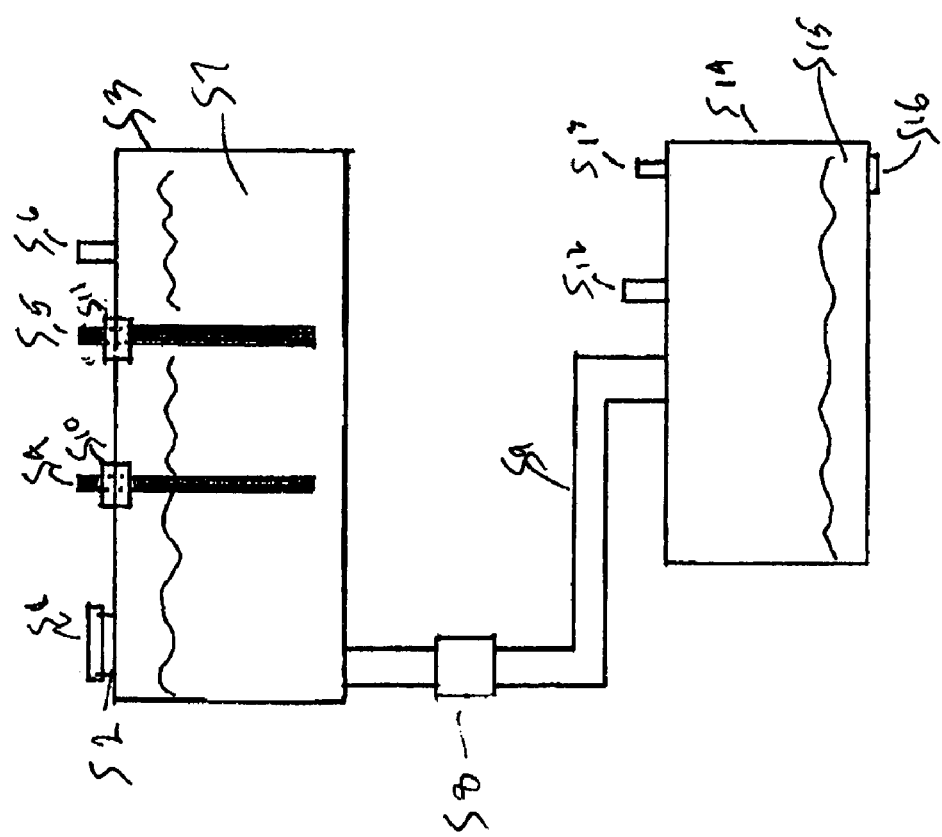

METHOD AND APPARATUS FOR GENERATING HYDROGEN

This application claims the benefit of U.S. Provisional Applications No. 60/506,327, filed on Sep. 25, 2003, No. 60,495,291, filed on Aug. 16, 2003; No. 60,486,357, filed on Jul. 11, 2003, and also claims the benefit of No. 60/479,396, filed on Jun. 18, 2003, which applications are incorporated herein by reference.

TECHNICAL FIELD OF THE INVENTION

The present invention pertains to a method and apparatus for generating hydrogen.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel may solve many environmental problems associated with the use of petroleum based fuels. Cost-effective, safe and efficient storage of hydrogen gas is important for many applications that use hydrogen. In particular, minimizing the volume and weight of hydrogen storage systems is important in mobile applications.

Several methods of storing hydrogen currently exist but are either inadequate or impractical for consumer applications. For example, hydrogen can be stored in liquid form at very low temperature or hydrogen can be stored under high pressure in cylinders, however, both of such storage methods are not practical for most consumer applications for a number of well known reasons related, for example, to safety and economics. Other methods of hydrogen storage include the use of chemical compounds that either: (a) chemically react with water or other species to generate hydrogen; or (b) reversibly adsorb and then release hydrogen. However, these methods are also not practical for most consumer applications for a number of well known reasons related, for example, to safety and economics.

U.S. Pat. No. 6,534,033 issued Mar. 18, 2003, discloses a hydrogen generation system that includes a stabilized metal hydride solution and a hydrogen generation catalyst system which includes a supported hydrogen generation catalyst having molecules of a hydrogen generation catalyst bound to, entrapped within, and/or coated onto a substrate. In one disclosed system, mechanical pumps pump a sodium borohydride solution through a catalyst chamber containing precious metal catalysts. One disadvantage of such a system is that mechanical pumps are not only unreliable and heavy, but tend to leak and/or clog in the presence of the highly caustic solutions used. This reduces the reliability of the device. In addition, precious metal catalysts tend to wash out of the catalyst chamber due to the abrasive nature of the solution. This loss of precious metal catalyst is not only expensive but also results in seriously reduced catalytic activity and reduced hydrogen output. In further addition, the catalyst chamber must be periodically replaced.

U.S. Patent Application No. 2004/0009392 A1, published on Jan. 15, 2004, (the "'392 Application"), discloses a compact and efficient hydrogen generator operating on the electro-galvanic principle in which hydrogen is generated by establishing an electrical connection between a cathode material and an anode material that is at least partially submerged in a stabilized metal borohydride electrolyte solution, wherein the cathode material forms at least part of the inner surface of the electrolyte container. '392 Application FIGS. 1 and 1A. Further embodiments provided in the '392 Application include the use of an anode fabricated from many types of anode material ('392 Application FIG. 3); the use of internal and external water storage and release into the electrolyte to replenish water consumed during hydrogen production ('392 Application FIGS. 4-6); the use of multiple anodes fabricated from the same anode material and an electrolyte storage and release tank made of different materials ('392 Application FIG. 7); and the implementation of a mechanism for raising or lowering the anodes from or into the electrolyte solution ('392 Application FIG. 8). The teachings of the '392 Application are incorporated herein by reference into the present application.

SUMMARY OF THE INVENTION

One or more embodiments of the present invention overcome one or more of the above-identified problems, or overcome limitations in the art. In particular, one embodiment of the present invention is a hydrogen generator system that comprises: (a) two or more anode materials; (b) a cathode material; and (c) an electrolyte; wherein the electrolyte comprises a metal hydride, at least one stabilizing agent, and a solvent; and wherein hydrogen gas is generated whenever an anode material and the cathode material are electrically connected, and wherein the different anode materials can be used separately or in combination to control the quantity and rate of hydrogen generation.

Another embodiment of the present invention is a hydrogen generator with an insulating shield to catch reaction debris from the anodes. A further embodiment of the present invention is a hydrogen generator with the electrodes at least partially covered by an inert layer that can be removed to initiate hydrogen production. Yet another embodiment is a self-regulating hydrogen generator in which the electrodes are extracted from the electrolyte solution as the cell pressure increases. A further embodiment is a self-regulating, self-starting and self-pressurizing hydrogen generator utilizing a catalyst chamber. In another embodiment, utilizing the addition of salts, acids or silicates to the metal hydride electrolyte, the hydrogen generator can function as a battery to generate electrical current.

BRIEF DESCRIPTION OF THE DRAWINGS

FIGS. 2A, 2B, 2C and 2D show a hydrogen generator with multiple anode materials.

FIG. 5 shows a self-regulating, self-starting and self-pressurizing hydrogen generator using a catalyst chamber.

DETAILED DESCRIPTION OF THE INVENTION

Figure 1A:
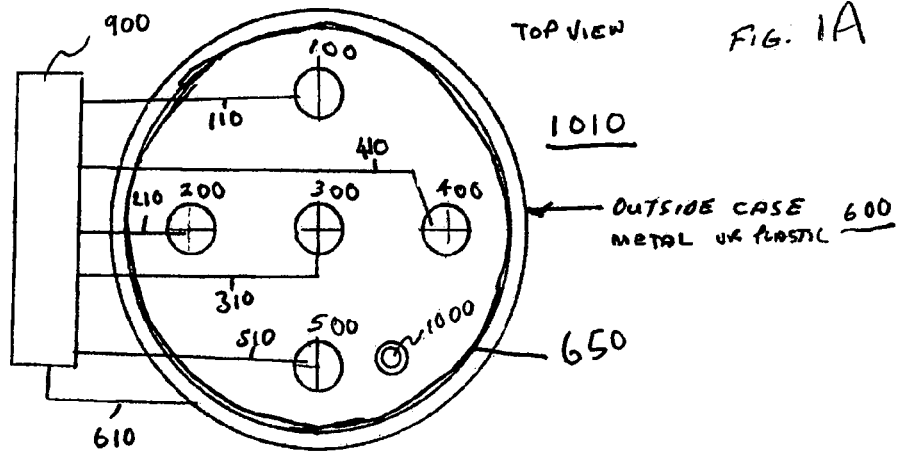
FIG. 1A and 1B show a hydrogen generator with multiple anode materials.

It is believed that an oxidation-reduction potential generated between an anode material and a cathode material facilitates: (a) an electro-galvanic hydrogen generation mechanism that causes hydrogen gas to be generated from an electrolyte that includes water; and (b) a chemical hydrogen generation mechanism that causes hydrogen gas to be generated from a chemical reaction among constituents of the electrolyte, both of which hydrogen generation mechanisms are regulated by the rate at which current is drawn by electrically connecting the anode material and the cathode material.

In accordance with one or more embodiments of the present invention, while any material with a voltage in the electrochemical series less than zero volts may be used as an anode material, the more negative the voltage, the faster hydrogen will be produced. '392 Application at paragraph [024]. Materials with an electronegativity more negative than −0.75 Volts, with low molecular weight and high density, are preferred materials including group 2 and 3 elements, i.e., the lanthanide metals and actinide metals, magnesium, aluminum, zinc, beryllium, titanium, vanadium, chromium, silicon, iron, nickel, and zirconium. '392 Application at paragraph [024].

Further embodiments of the present invention include, without limitation, the use of the following compounds, alloys or amalgams to fabricate at least one of the electrodes: titanium tetrachloride ($TiCl_4$), zirconium tetrachloride ($ZrCl_4$), aluminum boron, silicon iron, sodium hydroxide, sodium compounds and amalgams, gallium mercury amalgams, copper amalgams, or zirconium alloys, amalgams or compounds. The term amalgam is used to refer to an intimate plastic mixture of a metal or metals with another metal or compound. In addition, one or more of the electrodes may be fabricated from the following materials: graphite particles, graphite mixed with metal particles, carbon granules, carbon granules mixed with metal particles, carbon nanoparticles or nanofibers, carbon nanoparticles or fibers mixed with metal particles, silver-impregnated graphite, nickel beryllium alloys, nickel alloys, copper alloys, silver alloys, or nickel-cobalt-iron alloys. Furthermore, one or more of the electrodes may be fabricated from the following items: carbon rods; commercially available motor brushes with or without metals in them; graphite or carbon screens, wires or tubes (as set forth in more detail below); graphite or carbon twisted wrapped, twisted or braided with metal wires; commercially available wire. brushes; plastic brushes, electro-plated, sputter-coated or otherwise covered with a conductive material; and metal, ceramic or plastic wools. Furthermore, electrodes may be bent, machined, twisted or formed into a variety of different shapes, as described in more detail below.

In accordance with one or more embodiments of the present invention, the active material acts as an anode material. In the case of a metal, the reaction at an anode of the hydrogen generator is:

  (1)

where M is the metal. Thus, for Mg:

  (2)

and for Zn:

  (3)

It is believed that the external electrical connection between an anode material and the cathode material facilitates these exothermic reactions, which exothermic reactions are otherwise inhibited by an oxide coating on the metal. In addition, it is believed that the cathode material produces reduced species in the water ($OH^-$), which reduced species migrate back to the anode material and react with the anode material to complete the reaction as stated above. Thus, hydrogen generation can be turned on or off by making or breaking the electrical connection between the anode material and the cathode material.

It is believed that a corresponding reaction at a cathode of the hydrogen generator formed of an inert cathode material is:

  (4)

As can be readily appreciated, there is no need for the cathode to participate chemically. However, embodiments of the present invention exist wherein the cathode material is consumable. As originally set forth in the '392 Application, for example and without limitation, a consumable cathode material may be $MnO_2$. For such a cathode material, a reaction at the cathode of the hydrogen generator would be:

  (5)

As described above, the $OH^-$ species will be attracted to the anode to maintain the charge balance from the loss of electrons, and the corresponding reaction at the anode of the hydrogen generator, for example and without limitation, would be:

  (6)

It should be noted that the presence of a consumable cathode material may take up space that might be used for anodic material, thereby reducing the amount of hydrogen that can be produced from a given space.

In accordance with an embodiment of the present invention, the electrolyte includes a reducing compound (as in the case of a solution of a borohydride). It is believed that the oxidation-reduction potential generated between the anode material and the cathode material facilitates the release of hydrogen from the borohydride as well. In particular, it is believed that a chemical reaction occurs wherein the borohydride is oxidized by water to generate hydrogen. Such a chemical reaction wherein hydrogen gas ($H_2$) and borate ($BO_2^-$) are generated by reacting borohydride with water is represented as follows:

  (7)

The resulting borate is non-toxic and environmentally safe. In addition, borate can be regenerated into borohydride.

Hydride solutions useful in fabricating embodiments of the present invention include a metal hydride. The term "solution," as used herein, includes a liquid in which all the components are dissolved and/or a slurry in which some of the components are dissolved and some of the components are undissolved solids. The term "about," as used herein, includes plus or minus 10% of the stated value. Complex metal hydrides may also useful in fabricating one or more embodiments of the present invention. Such complex metal hydrides have a general chemical formula $MBH_4$, where M is an alkali metal selected from Group 1 (formerly Group IA) of the periodic table, for example and without limitation, lithium, sodium or potassium—M may, in some cases, also be ammonium or organic groups; B is an element selected from group 13 (formerly Group IIIA) of the periodic table, for example and without limitation, boron, aluminum, and gallium; and H is hydrogen. Examples of metal hydrides useful in fabricating one or more embodiments of the present invention include, for example and without limitation, $NaBH_4$ (sodium borohydride), $LiBH_4$ (lithium borohydride), $KBH_4$ (potassium borohydride), $NH_4BH_4$ (ammonium borohydride), $(CH_3)_4NH_4BH_4$ (tetramethyl ammonium borohydride $((CH_3)_4NH_4BH_4)$, $NaAlH_4$, $LiAlH_4$, $KAlH_4$, $NaGaH_4$, $LiGaH_4$, $KGaH_4$, quaternary borohydride, and mixtures thereof. It is believed that metal hydrides, especially borohydrides, are most stable in water, i.e., the metal hydrides do not readily decompose when in contact with water.

In accordance with the present invention, stabilized metal hydride solutions useful in fabricating embodiments of the present invention include: (i) a metal hydride, (ii) at least one stabilizing agent, and (iii) a solvent. In accordance with such embodiments of the present invention, the metal hydride solution includes at least one stabilizing agent, since aqueous borohydride solutions slowly decompose unless stabilized. A stabilizing agent, as used herein, means any component which retards, impedes, or prevents the reaction of metal hydride with water. Typically, effective stabilizing agents maintain room temperature (25° C.) metal hydride solutions at a pH of greater than about 7, preferably greater than about 11, more preferably greater than about 13, and most preferably about 14.

Useful stabilizing agents include the corresponding hydroxide of the cation part of the metal hydride. For example, if sodium borohydride is used as the metal hydride, the corresponding stabilizing agent would be sodium hydroxide. Hydroxide concentrations in stabilized metal hydride solutions of the present invention are greater than about 0.1 molar, preferably greater than about 0.5 molar, and more preferably greater than about 1 molar or about 4% by weight. Typically, metal hydride solutions are stabilized by dissolving a hydroxide in water prior to adding the borohydride salt. Examples of useful hydroxide salts include, for example and without limitation, sodium hydroxide, lithium hydroxide, potassium hydroxide, and mixtures thereof. Sodium hydroxide is preferred because of its high solubility in water of about 44% by weight. Although other hydroxides are suitable, the, solubility differences between various metal hydrides and various hydroxide salts must be taken into account since such solubility difference can be substantial. For example, adding too much lithium hydroxide to a concentrated solution of sodium borohydride would result in precipitation of lithium borohydride.

Other non-hydroxide stabilizing agents include those that can raise the overpotential of the metal hydride solution to produce hydrogen. These non-hydroxide stabilizing agents may be used in combination with hydroxide salts. Non-limiting examples of non-hydroxide stabilizing agents include compounds containing the softer metals on the right side of the periodic chart. Non-limiting examples of these non-hydroxide stabilizing agents include compounds containing lead, tin, cadmium, zinc, gallium, mercury, and combinations thereof. Compounds containing gallium and zinc are preferred, because these compounds are stable and soluble in the basic medium. For example, zinc and gallium form soluble zincates and gallates, respectively, which are not readily reduced by borohydride.

Compounds containing some of the non-metals on the right side of the periodic chart are also useful in stabilizing metal hydride solutions. Non-limiting examples of these non-hydroxide stabilizing agents include compounds containing sulfur, such as sodium sulfide, thiourea, carbon disulfide, and mixtures thereof.

In accordance with an embodiment of the present invention, sodium borohydride and other metal hydride solutions may be stabilized and thickened by the addition of one or more of the following materials: glycols, glycerin, glycerol, graphite, water soluble oils, lecithin, silica gels, calcium gels, synthetic or natural carboxy methyl starches, anisotropic materials, gelatin, diboron trioxide, boric anhydride, water-soluble hydrophobic beads, layers, etc., water-soluble polymers, synthetic fibers, pulp, textile fibers, fabrics, pulp, wetting agents, surfactants, flocculants, michelle formulation, carboxylates, sulfonates, sulfates, phosphates, cationics, ethylene oxides, combinations of anionic and cationic solubilizing groups, anionic surfactants, nonionic surfactants, polyoxethylene, surfactants (ethoxylates), amphoteric surfactants, imidazolium derivatives and the like; synthetic water-soluble resins; or an ionized water-metal borohydride amalgam. By the addition of one or more of the materials from the preceding group a metal borohydride solution may be formed in any viscosity, as a freely-flowing liquid, a thixotropic liquid, a gel, a suspension or a slurry.

Since metal hydride solutions used to provide one or more embodiments of the present invention are stabilized, hydrogen will not be generated unless and until an electrical connection is made between the anode material and the cathode material. Further, upon removal of the electrical connection, no hydrogen generation occurs.

The reaction of a metal hydride with water (for example, as per eqn. (7)) depends on temperature so that higher rates of hydrogen gas production occur as the reaction temperatures increase. However, it is believed that, for a given combination of electrodes, the rate of hydrogen generation is fairly constant even for decreasing concentrations of borohydride, and that the hydrogen generation rate will be fairly constant at a given temperature until the metal hydride concentration in solution is almost exhausted.

Note that according to eqn. (7) all of the hydrogen atoms present in borohydride and water are converted to hydrogen gas, and that half of the hydrogen atoms in the hydrogen gas produced by eqn. (7) comes from the water. As such, a theoretical hydrogen conversion ratio can be calculated from eqn. (7). For example, if lithium borohydride is used, the total weight of the reactants is 58 grams/mole: one mole of lithium borohydride weighs 22 grams, and two moles of water weighs 36 grams. Since 8 hydrogen atoms are produced, the theoretical hydrogen conversion ratio is 13.8% by weight of hydrogen. The maximum solubilities of various borohydrides are as follows: $NaBH_4$—about 35% by weight of the stabilized metal hydride solution; $LiBH_4$—about 7% by weight of the stabilized metal hydride solution; $KBH_4$—about 19% by weight of the stabilized metal hydride solution. Weight percentages in excess of the maximum solubilities for each listed borohydride will result in a slurry, i.e., a liquid mixture having insoluble components. As is well known in the art, mixing or stirring means are typically used to help dissolve the solid components of a slurry with additional water. For example, in the above calculation, 22 grams of lithium borohydride in 36 grams of water provides a 37.9% by weight solution of lithium borohydride. Since the 37.9% by weight solution of lithium borohydride exceeds its maximum solubility, this fuel mixture is a slurry.

Since two water molecules are consumed for each borohydride molecule, according to eqn. (7), the concentration of all the remaining components (i.e., the cation, the borate, and the borohydride) will increase as the reaction of eqn. (7) continues. Therefore, twice as many water molecules as borohydride molecules are needed to sustain a constant rate of reaction. In accordance with embodiments of the present invention, this excess water can be provided in a number of ways: (a) charging the electrolyte with excess water, i.e., starting with a dilute solution; (b) adding water from a separate source during or after the reaction; and (c) adding water from an internal source during or after the reaction. Adding water from a separate source during or after the reaction may be useful when the hydrogen generator is utilized in conjunction with a hydrogen-consuming device (as used herein, a hydrogen-consuming device means a device that uses hydrogen as a fuel such as, for example and without limitation, a fuel cell, a combustion engine, a gas turbine, and so forth) because a main byproduct of hydrogen oxidation in a hydrogen-consuming device is water. In such a case, water output from the hydrogen-consuming device can be added to the electrolyte. Adding water from an internal source during or after the reaction may be carried in accordance with the embodiment shown in FIG. 4 of the '392 Application and described therein at paragraph [0060].

In accordance with an alternative embodiment of the present invention, the chemical reaction of eqn. (7) may also be driven by a potential between an anode material and a cathode material that is provided by a power source such as, for example and without limitation, a battery, a power supply, and so forth. In such alternative embodiments, the anode material and the cathode material may be the same since the potential that drives the chemical reaction is provided by the external power source.

In accordance with another embodiment of the present invention, a battery or a power supply may be electrically connected between the cathode material (using the negative terminal of the battery or power supply) and an anode material, for example, one of the anode materials of hydrogen generator 1010 shown in FIG. 1 (using the positive terminal of the battery or power supply). A switch, for example and without limitation, a solid state switch, or a computer or microprocessor controlled switch, may also be utilized to make or break the electrical connection. In accordance with one or more such embodiments, when the battery or power supply is provided: (a) more hydrogen is generated when the anode and cathode material are such that they provide an oxidation-reduction potential; and (b) hydrogen is generated when the anode and cathode material are such that they do not provide an oxidation-reduction potential, for example, they are the same material. In accordance with a further alternative embodiment of the present invention, a capacitor can be connected in the circuit which electrically connects the anode material and the cathode material so that electrons produced by the hydrogen generator will charge the capacitor (because the capacitor will prevent electrons from flowing from the anode material to the cathode material, it is believed that this suppresses hydrogen production). Then, in accordance with this alternative embodiment of the present invention, a switch in the circuit electrically reverses the capacitor in accordance with any one of a number of methods that are well known to those of ordinary skill in the art so that the capacitor may discharge. It is believed that this discharge will enable hydrogen to be generated; and if the capacitor's discharge charge is in addition to an electrical connection between the anode material and the cathode material, it is believed that this will increase the hydrogen generation rate over that obtained with the electrical connection between the anode material and the cathode material alone. In a further embodiment, the capacitor could apply a pulsing discharge to the hydrogen generator by being charged by a subsidiary pulse oscillator circuit in accordance with any one of a number of methods that are well known to those of ordinary skill in the art. In a still further alternative embodiment, a voltage regulator could be placed in the circuit to regulate the voltage to the generator to increase or decrease the voltage to the generator; and to increase or decrease the hydrogen generator rate (and even to decrease it to zero by breaking the electrical connection between the anode material and the cathode material). In still further alternative embodiments, semiconductor devices could be used to regulate hydrogen gas output; resistors could be used to limit hydrogen gas output; logic circuits could be used to regulate the voltage to the generator and its function of generating hydrogen. In light of the above, switch assemblies 900 in FIG. 1A and 130 in FIG. 2C would include the battery, power supply, solid state switch, the capacitor circuit, the logic circuits to regulate the voltage to the generator, the microprocessor controlled switch, and so forth as described above.

In accordance with further embodiments of the present invention, since a current is created by one or more of the above-described exothermic reactions, the electrical energy that is created at the same time that the hydrogen is generated may also be beneficially used as well. For example, it may be used to recharge a battery.

In accordance with one or more embodiments of the present invention, one or more of the following may be added to the electrolyte to increase its electrical conductivity: salts, acids (see, e.g., Van Nostrand's Scientific Encyclopedia, p 23-24, 1956-57 (5th ed.)), graphite, carbon nanofibers, thereby increasing the rate at which hydrogen gas is created when an external electrical connection is made between anode and cathode materials. In accordance with a further embodiment, if solutes such as acid and/or salt and/or silicate are added to the electrolyte, the hydrogen generator may, in addition to hydrogen generation, function as a battery to generate electric current. In accordance with a further embodiment of the present invention, this battery could be used to charge the external capacitor described above, or to provide the power for the switch assembly described in more detail below and shown as 900 in FIG. 1A and 130 in FIG. 2C

As specific examples, and in accordance with embodiments of the present invention, the electrolyte is, for example and without limitation, salt water (for example, sea water); or a solution of sodium borohydride, sodium hydroxide (as a stabilizing agent), and water (and perhaps a gel such as sodium silicate or sodium metasilicate to act as a thickening agent in an amount in a range from about 0.001% to about 16% to help prevent sloshing). In accordance with one or more further embodiments of the present invention, an additive such as, for example and without limitation, ethylene glycol could be added to the electrolyte to prevent freezing. In accordance with one or more embodiments of the present invention, the viscosity of the electrolyte can be from water-like to grease- or tar-like, or any viscosity therebetween, e.g., the electrolyte may be in a liquid form or in a jelly form.

Figure 1B:
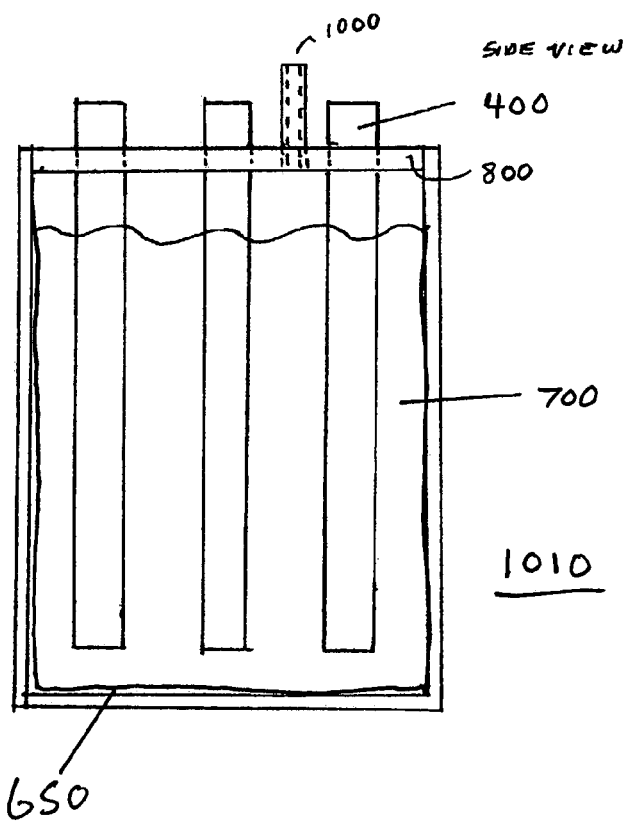

FIGS. 1A and 1B show top and side views, respectively, of a hydrogen generator 1010 fabricated in accordance with the present invention. Advantageously, in accordance with embodiments of the present invention, the hydrogen generator 1010 may be fabricated in sizes comparable to those of commercially available button cell batteries, for example and without limitation, an "A" cell battery, an "AAA" cell battery, a "D" cell battery, and so forth depending on the amount of hydrogen gas required for a particular application.

As shown in FIGS. 1A and 1B, hydrogen generator 1010 includes a container 600 which may be fabricated from a cathode material. In accordance with embodiments of the present invention, container 600 may be fabricated from a further material and then coated or plated on its inside surface with a cathode material 650, i.e., such that the cathode material faces the electrolyte solution 700 (formulated as discussed in detail above). In accordance with other embodiments, the "further material" may be, for example and without limitation, a non-conductive plastic, a metal, a conductive plastic, a ceramic, stone, fiberglass, and so forth (for example, container 600 could be steel which is chrome-plated or plated with any metal or alloy on the inside to form cathodic material 650). As further shown, top 800 is fixed to container 600 to prevent the escape of electrolyte 700 and to prevent hydrogen gas from escaping the hydrogen generator other than through conduit 1000. Top 800 can be fabricated, for example and without limitation, from a non-conductive plastic, such as Teflon, nylon, polyethylene and so forth, a plastic-coated metal, a ceramic, stone, fiberglass and so forth, and fixed to electrodes 100, 200, 300, 400 and 500, and conduit 1000 to seal the electrolyte within the hydrogen generator and to prevent hydrogen from exiting the generator other than through conduit 1000. Alternatively, top 800 can be made of conducting plastic, metal, and so forth, with electrically insulating rings or regions disposed around electrodes 100, 200, 300, 400 and 500, and conduit 1000. Electrodes 100, 200, 300, 400 and 500 comprise at least two electrodes fabricated from different materials. For example, and without limitation, electrodes 100, 200, 300, 400 and 500 could be a group I or group II metal, aluminum, nickel, zinc, iron, or cadmium, respectively.

Conduit 1000 may be filled with a hydrophobic filter (not shown), which hydrophobic filter may be fabricated utilizing any one of a number of filter materials that are well known to those of ordinary skill in the art such as, for example and without limitation, filters obtained from one or more of Whatman, Inc. of Clifton, N.J., Pall Corporation of East Hills, N.Y., Osmonics of Minnetonka, Minn., and Arbor Technologies, Inc. of Ann Arbor, Mich. The hydrophobic filter may be disposed inside conduit 1000, though alternative embodiments exist wherein the hydrophobic filter may be disposed outside or even inside a hydrogen generator 1010 in a position so that the hydrogen gas generated passes therethrough. See, e.g., FIG. 5. As a result, water is prevented or impeded from flowing with or amongst the hydrogen gas. It should be noted that such a hydrophobic filter may be similarly used with any of the embodiments described herein and as shown in FIGS. 2, 3, 4 and 5.

As set forth in detail above, cathode material 650 is a less active material than the anode materials from which electrodes 100, 200, 300, 400 and 500 are formed. The anode materials may fabricated in any one of a number of forms such as, for example and without limitation, a porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, woven or braided materials and so forth. Additionally, the anode materials may be encased in a porous frame that fits into the container to prevent electrical conduction between the anode materials and the cathode material. The frame may be fabricated from any one of a number of insulating materials such as, for example and without limitation, non-conductive plastic. As set forth in detail above, electrolyte 700, is a stabilized metal hydride solution that may be a liquid of any viscosity, a thixotropic liquid, a slurry, a gel, or a suspension. Container 600 may made of a conducting material, wherein the conducting material may be a cathode material or have a cathode material plated on the surface facing the inside of container 600 and electrolyte 700, in which case electrically conducting wire 610 may be placed in electrical contact with the outside of container 600. Container 600 can be formed of insulating material with the cathode material plated on its inside surface, in which case electrically conducting wire 610 be connected to an electrically conducting region in the wall of insulating container 600, or pass through an opening in the wall of container 600, thereby establishing electrical contact between the cathode material and wire 610.

As further shown in FIGS. 1A and 1B, hydrogen generator 1010 includes electrically conducting wires 110, 210, 310, 410 and 510 which connect electrodes 100, 200, 300, 400 and 500, respectively, to switch 900, and electrically conducting wire 610 which connects the cathode material 650 to switch 900. Thus, using switch 900, an electrical connection can be established between one or more of electrodes 100, 200, 300, 400 and 500, and the cathode material. One of skill in the art will understand that switch 900 may be implemented in a number of ways, e.g. using manually-operated mechanical switches, or computer-controlled electronic or mechanical switches as discussed above. Furthermore, switch 900 may use either binary "on-off" switching or variable electrical resistances to allow for greater control over the amount of current passing through each of electrodes 100, 200, 300, 400 or 500. Thus, by using switch 900 to select and control the current passing through different combinations of electrodes 100, 200, 300, 400 and 500, wherein electrodes 100, 200, 300, 400 and 500 are formed from different materials that generate hydrogen at different rates, the rate and quantity of hydrogen generation can be accurately controlled.

FIGS. 2A and 2B show top and side views, respectively, of a hydrogen generator 1020 fabricated in accordance with the present invention. As shown in FIG. 2A, hydrogen generator 1020 includes a container 101, a metal hydride electrolyte 111, (formulated as discussed in detail above), a cathode material 121 disposed on the inside surface of container 101, bent wire tubes 11, 21, 31 and 41 that may be composed of or contain anode materials, a top 71 and a conduit 61, wherein conduit 61 contains an opening 51 for releasing the hydrogen produced by hydrogen generator 1020. Top 71 may be attached to container 101 by means of a crimp or fold 81 in the wall of container 101 with an electrically insulating seal 91 disposed between fold 81, the unfolded portion of the wall of container 101 and top 71. In accordance with an embodiment of the invention, seal 91 may be made from one of several suitable materials, such as Teflon, neoprene or similar materials. Top 71 may be affixed to container 121 using any one of a number of methods that are well known to those of ordinary skill in the art such as, for example and without limitation, by screwing or clipping it to container 121. As described in detail above, container 101 may be fabricated from an insulating or conducting material and then be coated with a cathode material on the inside surface that faces electrolyte 111. In another embodiment, container 101 may be fabricated from a cathode material.

As further shown in FIGS. 2A, 2B and 2C, the ends of bent wire tubes 11, 12, 13 and 14 pass through and are connected to top 71 at $11_1$, $11_2$, $21_1$, $21_2$, $31_1$, $31_2$, $41_1$, and $41_2$, respectively. As can be further seen in FIG. 2B, each bent wire tube is prevented from making electrical contact with top 71 by an annular insulator (only insulator 112 surrounding end $11_1$, of bent wire tube 11 is numbered in FIG. 2B). In accordance with such embodiments of the present invention, insulators 112 etc. may be fabricated from, for example and without limitation, plastic such as nylon, polyester, Teflon, polyethylene, and so forth. In addition, top 71 may be fabricated from any one of a number of materials such as, for example and without limitation, a metal, a conductive ceramic, a metal plated ceramic, a conductive plastic, and so forth. Alternatively, cap 71 may be fabricated from an insulating material.

As shown in FIGS. 2A and 2C, electrically conducting wires run from the ends of bent wire tubes $11_1$, $11_2$, $21_1$, $21_2$, $31_1$, $31_2$, $41_1$, and $41_2$, to switch 131. In accordance with one or more embodiments of the present invention, switch 131 (as explained above) may be semiconductor device that controls the current passing through different combinations of electrodes 11, 12, 13 and 14. Furthermore, because electrodes 11, 12, 13 and 14 are formed from different materials that generate hydrogen at different rates and quantities, switch 131 may be used to select and control the rate and quantity of hydrogen generated.

As shown in FIG. 2D, the anode 11, etc., may be fabricated in the form of U-shaped bent wire tubes. The wire may be an anode metal, or the tubes may be hollow and filled with anode material, the tubes being sufficiently porous to allow the electrolyte to contact the enclosed anode material. Though the embodiment shown in FIGS. 2D uses metal woven wire tubes with a round cross section, the tubes may be of hexagonal, square, rectangular or any other cross-section. Furthermore, the tubes may be made from any porous or screen-like anode material; any material onto which an anode material could be plated, coated or suspended; or any material which could be used to contain an anode material, wherein the anode material is selected from the list of materials given above, including anode materials in the form of powders, mixtures, and even viscous liquids, gels or slurries. Furthermore, the anodes may be W-shaped, coiled, etc., to maximize the anode material surface area exposed to the electrolyte.

Figure 3:
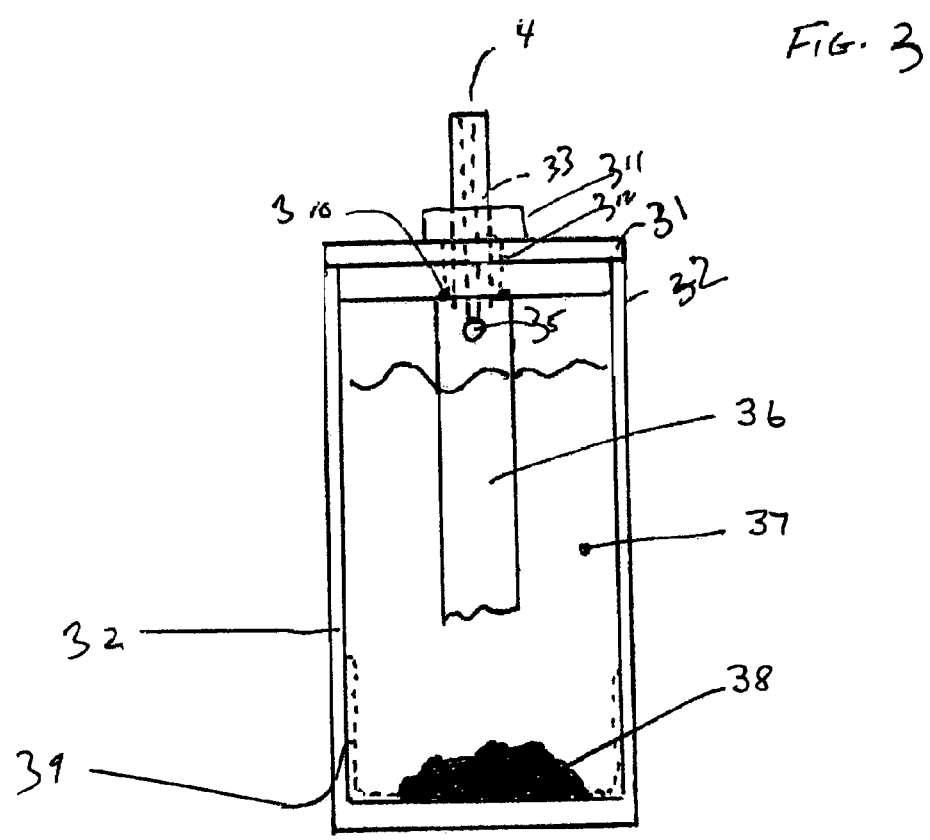
FIG. 3 shows a hydrogen generator with an insulating shield to trap anode reaction debris.

FIG. 3 shows a hydrogen generator with an insulating shield 39 that prevents reaction debris 38 from the anode, including but not limited to metal reaction debris, from coming into contact with the cathode material disposed on the inner surface of container 36, whereby the insulating shield prevents the anode reaction debris and cathode from causing spontaneous hydrogen generation. In one embodiment, the insulating shield may be in the form of an epoxy or plastic coating applied to the surface of the cathode material facing the electrolyte. In another embodiment the insulating shield 39 may be a removable plastic cup, or receptacle made from a material such as Teflon, Neoprene or another chemically resistant plastic. Though the embodiment shown in FIG. 3 has a single anode 36, an insulating shield may be used to prevent the reaction debris from multiple anodes from coming into electrical contact with the cathode materials and causing unwanted hydrogen generation to occur spontaneously.

In accordance with a further embodiment of the present invention, an inert removable coating or membrane may be placed on one or more of the electrodes in the hydrogen generation system. Such an inert coating would prevent hydrogen generation by electrically isolating the electrode from the electrolyte solution. Thus, only when the coating is removed from the one or more electrodes will substantial hydrogen generation be able to occur. Without limitation, examples of such a coating include an inert organic or inorganic material, such as a friable resin or wax. In one embodiment, the coating may be removed mechanically by a scraper or other device located within the cell but operated from the outside of the cell. One of ordinary skill in the art will appreciate that there are many methods by which the coating or membrane could be removed mechanically, such as a ring attached to a plunger that could be slid along a rod-like anode, or by using a scraper held against a rotatable anode. By using such inert coatings or membranes the shelf-life of hydrogen generators described in the present invention would be greatly increased. After a long period in storage, a mechanical operation to remove the coating or membrane would activate the hydrogen generator.

Figure 4A:
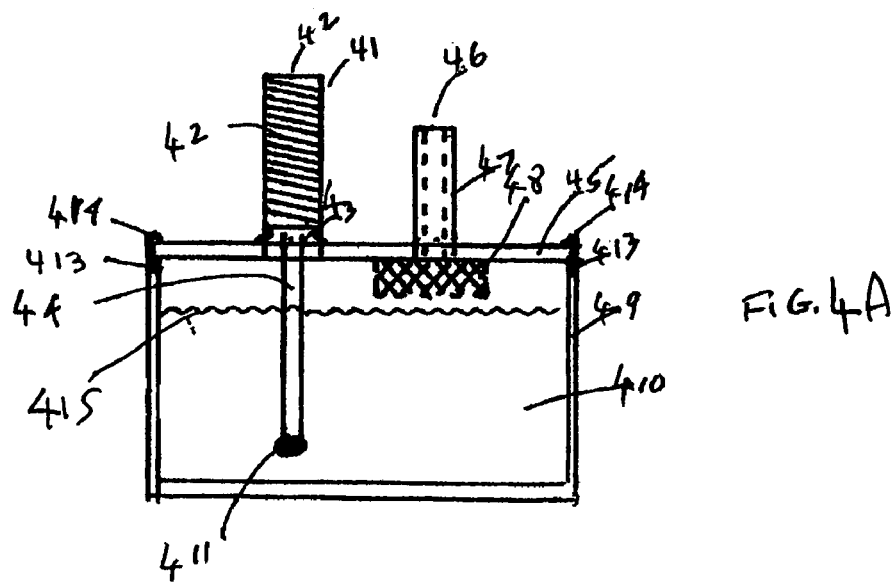
FIGS. 4A and 4B show a hydrogen generator that is self-regulated using hydrogen pressure.
Figure 4B:
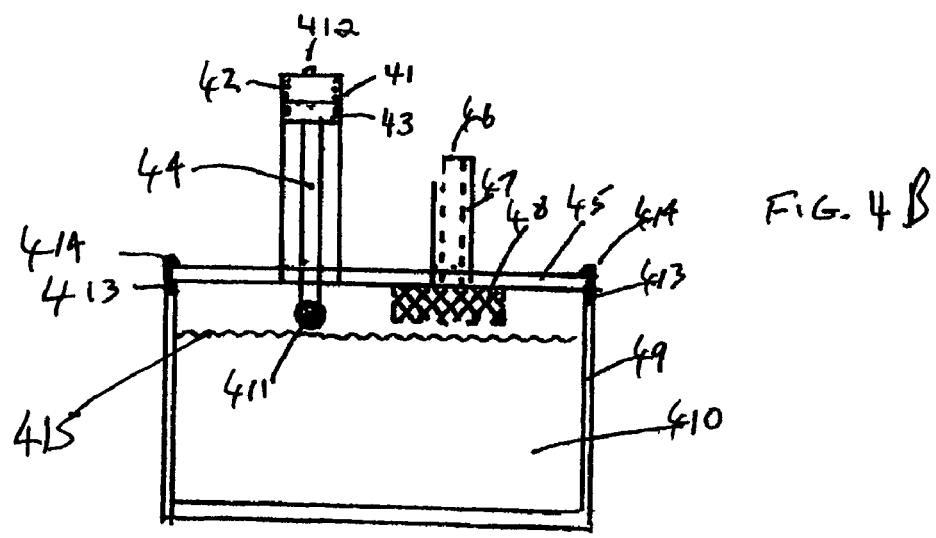

FIGS. 4A and 4B show a hydrogen generator that is fabricated in accordance with the present invention and is self-regulating. The generator is constructed from a container 49 containing a liquid metal hydride electrolyte 410, formulated as discussed in detail above. As for the embodiments described in detail above, container 49 may be formed from a cathode material or may have a cathode material coated on its inner surface such that cathode material contacts electrolyte 410. Top 45 is affixed to container 49 using seal 413 and crimp or fold 414, or by other means known to those of ordinary skill, such as screws, clips or welding, as set forth in detail above. A conduit 47 for releasing hydrogen through opening 46 is shown equipped with a hydrophobic filter 48. As explained in detail above, the hydrophobic filter 48 may be located within the conduit 47 or beyond opening 46. An air cylinder 41 with a compressed spring 42 is configured to urge cylinder plunger 43 in a downward direction towards the surface of the electrolyte 415. The anode 44 is attached at one end to cylinder plunger 43, while a catalyst material 411 is attached to the other end of anode 44. In FIG. 4A the catalyst 411 is completely submerged beneath the surface of electrolyte 415, while anode 44 is only partially submerged. According to such an embodiment, once a sufficient amount of hydrogen has been generated, the pressure of hydrogen gas can overcome the force exerted by spring 42 and will oppose the spring to raise the anode 44 and the catalyst material 411 above the surface of electrolyte 415.

FIG. 4B shows the hydrogen generator of FIG. 4A with the spring 42 compressed and the anode 44 and catalyst material 411 withdrawn above the level of the electrolyte surface 415, thereby terminating the generation of hydrogen. According to such an embodiment, once the gas pressure reduces, as the hydrogen is removed from the cell through conduit 47, the spring will push the anode 44 and catalyst material 411 into the electrolyte 410, at which point the catalyst material 411 will cause the hydrogen generation to resume, and the hydrogen pressure will begin to increase. Eventually, the hydrogen pressure will be sufficient to overcome the force of spring 42 and causing anode material 44 and catalyst material 411 to again be withdrawn above the level of the electrolyte surface 415. Such a cycle, whereby the anode and catalyst are sequentially removed and submerged in the electrolyte, will act as a self-regulating means of producing hydrogen at a given rate range. In such an embodiment, by adjusting the strength of spring 42 and the viscosity of the electrolyte, it may possible to critically damp the vertical oscillation of the cylinder and generate hydrogen at a constant rate until such time as the electrolyte is depleted. Though the embodiment shown in FIGS. 4A and 4B have a single anode 44, embodiments with multiple anodes made from multiple materials could be implemented to employ self-regulation using hydrogen pressure. In a further embodiment (not shown), no catalyst material need be fixed to the anode 44, sufficient hydrogen pressure being generated by the reaction of the anode 44 and the electrolyte 410 to operate the self-regulation mechanism described in detail above.

FIG. 5 shows a self-regulating, self-starting, self-pressurizing catalytic hydrogen generator that is fabricated in accordance with one or more embodiments of the present invention. As shown in FIG. 5, container 53 holds electrodes 55 and 54 that are submerged in a liquid metal hydride electrolyte 57, formulated as discussed in detail above. Container 53 may be fabricated from metal or plastic and is equipped as shown with a pressure relief valve 56, a filler port for introducing electrolyte 52, a filler cap 51, and a check-valve 58, i.e., a one-way valve. The electrodes 55 and 54 pass through the walls of container 53 but are prevented from making electrical contact with the wall of container 53 by annular insulators 510 and 511, respectively. As set forth in more detail above, the insulators may be fabricated from Teflon or some other suitable insulating material. The materials for electrodes 55 and 54 are chosen such that, when an electrical connection is established between these electrodes, hydrogen gas is produced, as set forth in detail above. In one or more embodiments of the hydrogen generator shown in FIG. 5, sacrificial metal electrodes such as Al, Zn, Mg, etc. may be used to generate hydrogen. In an embodiment of the hydrogen generator shown in FIG. 5, the electrodes may be attached to a spring loaded cylinder, see FIGS. 4A and 4B as discussed in detail above, to further regulate the rate and quantity of hydrogen production. Further, check-valve 58 may be a manually operated or computer-controlled solenoid valve, and more than the two electrodes shown in FIG. 5 may be used.

In the hydrogen generator shown in FIG. 5, check-valve 58 leads to catalyst chamber 59 which contains one or more conventional catalysts, whereby the metal hydride electrolyte will react to produce hydrogen gas, for example, by exposure to conventional catalysts such as Ru, Pt, Co and so forth. Such catalyst may be plated, coated or suspended on a substrate, as is known in the art. Upon passing through the catalyst chamber the spent electrolyte 515 and hydrogen enters spent electrolyte container 514, wherein spent electrolyte container 514 is provided with a pressure relief valve 512, a conduit 513 for extracting hydrogen, and a drain 516 for extracting spent electrolyte. Though not shown in FIG. 5, conduit 513 may be provided with a hydrophobic filter as described in detail above.

Conduits that enable hydrogen to exit a hydrogen generator that is fabricated in accordance with any one of the embodiments of the present invention may be fabricated in any one of a number of shapes. For example and without limitation, the conduits may have an arc-shape inside the container. Further, the conduit may have a multiplicity of holes therein which are disposed, for example and without limitation, inside the container. Advantageously, such holes may provide multiple access by hydrogen gas to the conduit to better enable the hydrogen gas to exit the hydrogen generator. Further still, an end of the conduit inside the container may have an expanded opening (such as, for example and without limitation, an opening in the shape of a funnel), which expanded opening may better enable hydrogen gas to exit the hydrogen generator. In accordance with one or more further embodiments of the present invention, filter membranes that only pass hydrogen may be disposed around and/or inside the conduit. Advantageously, such filter membranes may act to prevent electrolyte or reaction byproducts from exiting through the conduit if the hydrogen generator is jostled or turned upside down. Such filter membranes are well known to those of ordinary skill in the art and may be obtained from companies such as, for example and without limitation, W. L. Gore & Associates, Inc. of Elkton, Md., Celgard, Inc. of Charlotte, N.C., and so forth.

Although various embodiments that incorporate the teachings of the present invention have been shown and described in detail herein, those skilled in the art will readily understand that many other variations may be employed that will incorporate the present invention, and these variations are deemed to come within the scope of the present invention.

What is claimed is:

1. A hydrogen generator comprising at least two anodes; at least one cathode; and an electrolyte; wherein said anodes are formed from different materials; wherein the electrolyte comprises a metal hydride, at least one stabilizing agent, and a solvent, wherein an inert coating is disposed on a surface of at least one cathode or anode, and means for removing the inert coating, and wherein hydrogen gas is generated whenever an anode is electrically connected to the cathode by the removal of at least part of the inert coating.

* * * * *